Figure 1:
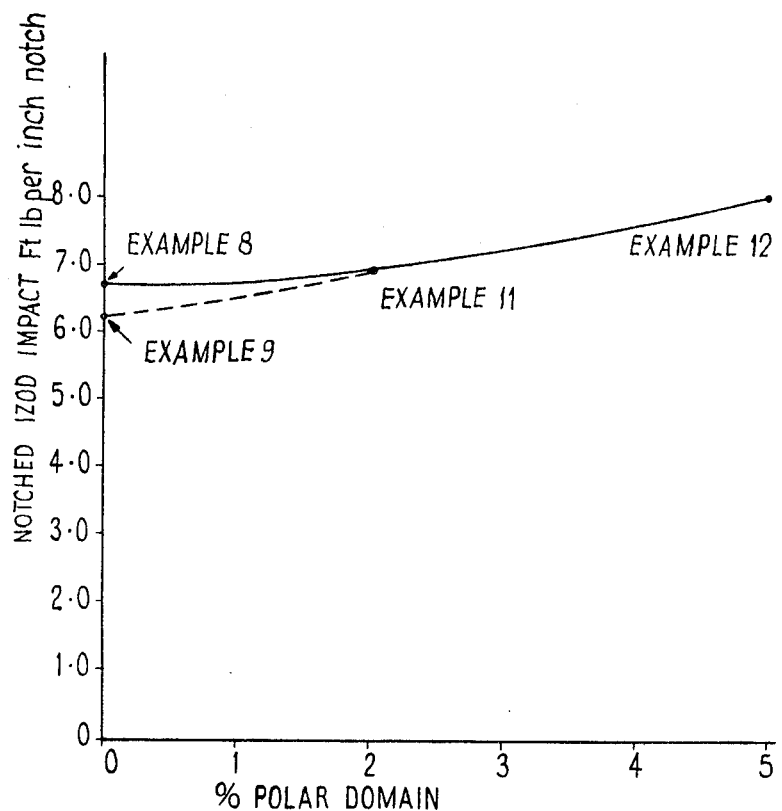

United States Patent

[11] 3,624,189

| [72] | Inventor | Conrad Goldman<br>298, Hazelwood Terrace, Rochester, N.Y. 14609 |
|---|---|---|
| [21] | Appl. No. | 793,751 |
| [22] | Filed | Jan. 24, 1969 |
| [45] | Patented | Nov. 30, 1971 |
| [32] | Priority | Jan. 31, 1968 |
| [33] | | Great Britain |
| [31] | | 4,989/68 |

[54] PROCESS OF HEATING ACRYLONITRILE-BUTADIENE-STYRENE POLYMERS WITH ELECTROMAGNETIC FIELD ENERGY
1 Claim, 3 Drawing Figs.

[52] U.S. Cl........................................... 264/25,
260/876 R, 260/887, 260/893, 260/894
[51] Int. Cl.......................................... B29h 5/26,
C08d 9/08, C08f 29/56
[50] Field of Search............................................ 260/893;
264/25, 26

[56] References Cited
UNITED STATES PATENTS

| 2,713,566 | 7/1955 | Reid................................ | 260/893 |
| 2,980,569 | 4/1961 | Wening.......................... | 154/45.9 |
| 3,103,498 | 9/1963 | Scriba et al..................... | 260/893 |
| 3,426,840 | 11/1969 | Glassford....................... | 264/25 |
| 3,487,132 | 12/1969 | Thorne........................... | 264/25 |

FOREIGN PATENTS

| 503,082 | 5/1954 | Canada.......................... | 260/893 |

Primary Examiner—Murray Tillman
Assistant Examiner—J. Seibert
Attorneys—Keith Misegades and George R. Douglas, Jr.

ABSTRACT: Methods for increasing the dissipation factor of acrylonitrile-butadiene-styrene polymers by the introduction of polar domains, thus improving the response to dielectric heating.
Also included are ABS polymers formed by the methods of the invention.

SAMPLE WGT. 47 GRAMS
RF UNIT 3.5 KW
22,000 VOLTS
80-100 MEGACYCLES
NEEDLE PYROMETER 0-400°F. RANGE 3,624,189

PROCESS OF HEATING ACRYLONITRILE-BUTADIENE-STYRENE POLYMERS WITH ELECTROMAGNETIC FIELD ENERGY

This invention relates in general to the dielectric heating of thermoplastic material and more particularly to methods for improving the response to dielectric heating of acrylonitrile-butadiene-stryene polymers, commonly referred to as ABS. The thermoplastic polymer described as ABS consists of (a) a blend of styrene-acrylonitrile copolymer resin and butadiene-acrylonitrile copolymer rubber, or (b) essentially a random terpolymer of acrylonitrile, butadiene and styrene, or (c) a complex containing random terpolymers, random copolymers and homopolymers of the three monomers acrylonitrile, butadiene and styrene. Also the ABS may contain certain block and graft co and terpolymers. Homologues of the monomers, such as alpha-methyl styrene and methacrylonitrile feature as raw materials for ABS. In the rest of this description and claims such polymers will be referred to as ABS polymers.

In my earlier U.K. Patent Application, titled "Thermoforming of Thermoplastic Polymers," No. 3897/68, dealing with means for increasing the dissipation factor of thermoplastic polymers, so that the polymers could be heated by dielectric means, polar domains are introduced into an otherwise nonpolar material. A polar domain as described in detail in my aforesaid earlier application can be briefly described as a chemical compound that when exposed to RF energy exhibits a high dipole moment and hence a high loss factor; polyacrylonitrile, containing as it does a high proportion of nitrile groups amounting to 49 percent on the polymer, is an example of a suitable polar domain. It is noted that some polar domains can exist in a polymer, and be ineffective if neutralized by cross linking, copolymerization with other materials, or graft polymerization, where the electron configuration of the originally polar domain is altered and weakened, or deprived of the necessary mobility.

Acrylonitrile-butadiene-styrene thermoplastic resins have many useful physical properties, which make them desirable for many products. In some methods for converting the raw material to finished products, such as thermoforming, the rate of heating sheets of plastic becomes important, especially with sheets greater than one-sixteenth inch in thickness. Methods have been disclosed in the aforesaid patent application for heating sheets of thermoplastic for various intervals of time, dielectrically, in stacked manner so as to enable resins having a low dissipation factor to be heated economically. The time to heat ABS polymers dielectrically appears to be disproportionately long, in relation to the concentration of polar domains contained within the polymer, indicating that the polar groups are arranged symmetrically or are bound by electron forces of other groups, or are immobilized by cross-linking effects, reducing the effectiveness of the polar components contained therein.

According to the present invention a small increase of the polar groups already in the polymer, results in an increase in dielectric heating rate of substantial magnitude, being in excess of four times faster for an increase of polar domain of only 5 percent based on the polymer weight.

Being thus able to increase productivity, by substantially shortening the heating cycle of dielectrically heated thermoplastic resins such as ABS, would undoubtedly justify nominal added costs involved in preparing the more dielectrically responsive ABS resins, according to the teachings of the present invention. These costs would be nominal, if the polar domain were incorporated by the prime producer, after polymerization, but prior to compounding and pelleting.

In one development of this invention the polar domain in the form of copolymer emulsion is blended with the ABS emulsion and then the blended emulsion is separated by such known methods as coagulation or centrifuging.

When the ABS resin is colored by custom compounders the polar domain can be conveniently incorporated at the same time, with minimal increase in cost to the consumer.

Although the present disclosure describes compounding of pigmented thermoplastic resin utilizing a Banburry as the fluxing equipment, various other fluxing units have been utilized, with comparable results, including two roll mills, extruders, and sigma blade mixers. In utilizing a Banbury, it is not necessary to preblend the ingredients for compounding colored materials. When compounding with an extruder, it is convenient and often desirable in order to ensure a more uniform color dispersion to preblend by tumble mixing, ribbon blending, or the use of intensive powder-mixing types of equipment such as used for compounding polyvinyl chloride resins, including the Henschel type of mixing equipment.

As already indicated the prime object of this invention is to provide a means for increasing the dissipation factor of ABS. A secondary object is to obtain in addition to the increased dissipation factor a substantial increase in the impact strength of the ABS.

Further according to the invention a modified acrylonitrile-butadiene-styrene polymer comprises (a) a copolymer of acrylonitrile and an ethylenically unsaturated vinyl monomer, selected from the group consisting of styrene, and alpha-methyl styrene, (b) an unsaturated monomer selected from the group of acrylonitrile and methacrylonitrile, grafted on to an elastomer selected from the group consisting of polybutadiene and butadiene-styrene-copolymers, and (c) a copolymer of acrylonitrile and butadiene as polar domains, with the acrylonitrile content of the polar domain at 25–35 percent by weight of the copolymer.

According to another aspect of the invention a means of substantially increasing the rate of heating of ABS by electromagnetic field energy comprises incorporating a highly polar acrylonitrile containing elastomeric polymer, in minor amounts, and subjecting the combined mass to electromagnetic field energy in dielectric heating equipment.

Polyacrylonitrile has a nitrile group content of 49 percent, and as a polar domain its activity is rated as 100 percent. Acrylonitrile polymers available commercially and suitable for use as polar domains for ABS include acrylonitrile-butadiene elastomeric copolymers with acrylonitrile contents of 30 to 50 percent by weight, that is of 14.7 to 24.5 percent nitrile group content, that is of 30 to 50 percent activity rating.

In order to illustrate the scope of this invention tests were carried out on two commercial ABS resins. The materials used were Union Carbide and Chemical Co. extrusion grade ABS Flow Rate 0.28 g. in 10 minutes (ATSM D1238–65T) and Marbon Chemical Co. injection grade ABS of Flow Rate 1.2. These materials are now referred to as E and I respectively.

Test specimens for tensile strength, elongation and notched Izod impact strength tests and for dielectric heating tests were prepared as follows:

Example 1: E material in granular form as received was used for molding the test specimens.

Example 2: E material was compounded in a laboratory Banbury mixer, rolled into sheets of about ¼-inch thickness disintegrated to granules and the test specimens molded from the granules.

Example 3: E material plus 1 percent titanium dioxide was compounded and the test specimens molded as described in (2).

Example 4: E material plus 1 percent titanium dioxide and 2 percent of an adhesive grade acrylonitrile-butadiene elastomer as polar domain was compounded and the test specimens molded, as described in (2).

Example 5: E material plus 1 percent titanium dioxide and 5 percent of an adhesive grade acrylonitrile-butadiene elastomer as polar domain, was compounded and the test specimens molded, as described in (2).

Example 6: E material plus 1 percent titanium dioxide and 2 percent of an oxygen-containing polar domain, was compounded and the test specimens molded, as described in (2).

Example 7: E material plus 1 titanium dioxide and 5 percent of an oxygen-containing polar domain, was compounded and the test specimens molded as described in (2).

Example 8: I material in granular form as received was used for molding the test specimen.

Example 9: I material was compounded in a laboratory Banbury mixer, rolled into sheets of about ¼-inch thickness disintegrated to granules and the test specimens molded from the granules.

Example 10: I material plus 1 percent titanium dioxide was compounded and the test specimens molded as described in (9).

Example 11: I material plus 1 percent titanium dioxide and 2 percent of acrylonitrile-butadiene elastomer of 35 percent to 40 percent acrylonitrile content (of the type used for modifying phenol-formaldehyde molding material) as polar domain was compounded and the test specimens molded as described in (9).

Example 12: I material plus 1 percent titanium dioxide and 5 percent of acrylonitrile-butadiene elastomer of 35 to 40 percent acrylonitrile content (of the type used for modifying phenol-formaldehyde molding material) as polar domain was compounded and the test specimens molded, as described in (9).

Example 13: I material plus 1 percent titanium dioxide and 2 percent of an oxygen-containing polar domain was compounded and the test specimens molded, as described in (9).

Example 14: I material plus 1 percent titanium dioxide and 5 percent of an oxygen-containing polar domain was compounded and the test specimens molded, as described in (9).

Example 15: E material with 1 percent titanium dioxide and 5 percent of an adhesive grade of acrylonitrile-butadiene elastomer as polar domain, was compounded in a laboratory Banbury mixer, rolled into sheets of about ¼-inch thickness and built up into a two-ply stack.

Example 16: I material with 1 percent titanium dioxide and 5 percent of acrylonitrile-butadiene elastomer of 35 to 40 percent acrylonitrile content (of the type used for modifying phenol-formaldehyde molding material) as polar domain, was compounded in a laboratory Banbury mixer and rolled into sheets of about ¼-inch thickness and built up into a five-ply stack 1¼-inches thick and a three-ply stack ¾-inch thick (16A).

The small amounts of polar domain incorporated into ABS convert electromagnetic field energy into thermal energy, when the ABS is subjected to electromagnetic fields, such as takes place in radio frequency dielectric heating equipment. The polar domain, when subjected to electromagnetic field energy, heats the mass in which it is incorporated, by conduction and radiation.

The dissipation factor of ABS is less than 0.009 and the dissipation factor of the polar domains of this invention are substantially greater than 0.009 and when a small amount of the polar domain is blended with the ABS the substantially greater dissipation factor of the polar domain has the effect of substantially reducing the current consumption in the dielectric heating of the ABS blend and of substantially shortening the dielectric heating time.

A simple method of rating the effectiveness of polar domains is to incorporate a specific small amount in a nonpolar medium and note the increase in the rate of heating of the composition in terms of B.t.u./lb./min. Degrees of temperature rise/min. of heating also serves as an indication of polar domain effectiveness. Other parameters such as specific heat of the mass being heated, the voltage drop across the specimen, the frequency of the electromagnetic energy applied to the mass must be known and considered if results from one test are to be related to the results of other tests performed with other equipment and other polymers. Working in the range of 2 percent addition of polar domains, effective comparisons can be made with equipment operating in the 80–100 megacycle range.

Figure 2:
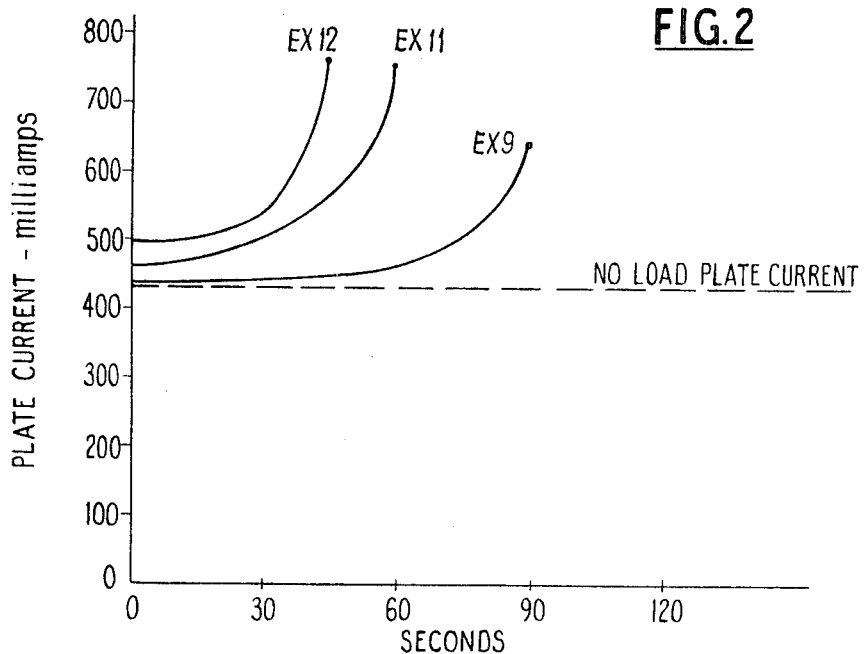
Figure 3:
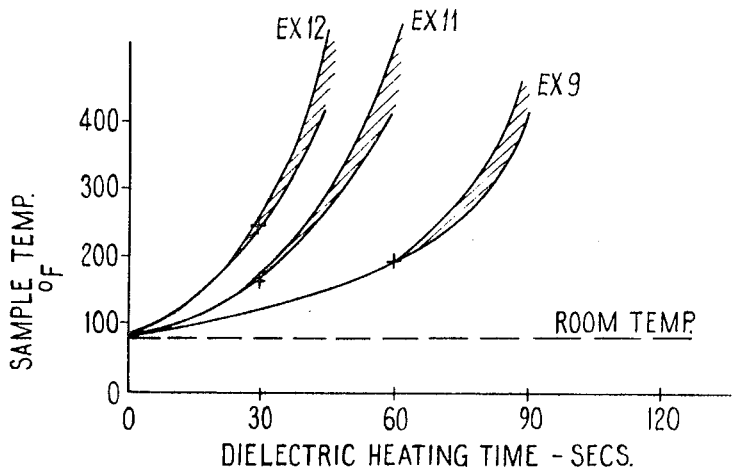

The effect of the polar domain on current consumption is illustrated in FIG. 2 and the effect on dielectric heating time in FIG. 3.

Substantially faster rates of heating are noted with 5 percent polar domain added, example 12, (equivalent to approximately 2 percent of added acrylonitrile). From FIG. 3, at 30 seconds heating, temperatures of 115°, 160° and 250° F. were reached, corresponding to an increase in temperature of 35°, 80° and 170° F. for zero, 2 and 5 percent polar domain additive; at 45 seconds heating, temperatures of 150°, 250° and greater than 400° F. were reached, corresponding to an increase in temperature of 70°, 170° and greater than 320° F.

The polar domains of this invention are of chemical composition related to that of ABS, that is, polar domains containing the nitrile group as in acrylonitrile. A small percentage increase in content of acrylonitrile, as a mobile polar domain markedly increases the dissipation factor of ABS resins. When elastomeric acrylonitrile-containing polar domains are used substantial improvement in impact strength of up to 30 percent is obtained, as a secondary advantage. FIG. 1 indicates the improvement obtained in impact strength by the incorporation of 2 and 5 percent of polar domain in ABS.

Acrylonitrile-containing materials obtainable as articles of commerce include elastomeric copolymers of acrylonitrile-butadiene, with acrylonitrile contents generally between 30 and 50 percent by weight.

The percentage of the polar domain used refers to the total amount incorporated, whether it be actually 35, 50, or 100 percent active material. This simplifies evaluation based on economics, testing etc., in that knowing the percent of active component in the polar domain incorporated into the ABS, a calculation can be made for comparison on a 100 percent activity basis.

Table I indicates that the incorporation of small amounts of polar domains into ABS does not significantly alter the general physical strength characteristics of the ABS. However, in table I examples 8, 9, and 10 indicate that the incorporation of 1 percent titanium dioxide pigment substantially inhibits degradation of impact strength during fluxing, example 12 with a combination of 1 percent titanium dioxide and 5 percent of an elastomeric acrylonitrile copolymer containing approximately 35–40 percent acrylonitrile, has improved the impact strength by about 30 percent compared with example 9 the fluxed ABS control material.

Table II illustrates the improvements obtained in dielectric heating by the incorporation of small amounts of polar domains in ABS. All of the materials from examples 2 to 14 were tested in the form of granules. The materials from examples 15 and 16 were tested in sheet form. It is shown that the injection molding grade of ABS, whether tested "as is" from the supplier example 8, fluxed example 9, or fluxed with 1 percent titanium dioxide example 10 has basically the same response characteristics; that is, in 60 seconds, a 47-gram sample, heated to about 190°–195° F., from room temperature while the amperage of current flowing through the plate circuit increased to a maximum of 460 ma. In contrast to this, example 11 reached a temperature of over 400° F. in 60 seconds, while the amperage flow in the plate circuit reached a value of 750 ma. This material contains 2 percent polar domain of an elastomeric copolymer of acrylonitrile-butadiene with an acrylonitrile content less than 50 percent. The effective increase in acrylonitrile content is therefore less than 1 percent. Since many ABS polymers contain 25 percent or more of indigenous acrylonitrile it is surprising that so small an increase in the total content of acrylonitrile can so profoundly influence the dielectric heating rate. A temperature rise of more than 320° F. (400°–80° F. room temperature) with the 2 percent polar domain compared to a rise of 110° F. (190°–80° F.) for the ABS with no added polar domain is in effect *triple* the heating rate.

In comparing granular material to a more dense form of the material being heated dielectrically, it is known that the greater the mass per unit volume between the electrodes, the greater the energy absorbed per unit time. This is due to the dependency of energy absorption being proportional to the dipole moment per unit volume, which will vary with the mass per unit volume, in general, neglecting the effect of concentration of polar domains, dilution phenomenon, and transducer effects, as more fully described in the above noted pate application. Test sample in sheet form example 15 having the same weight and cross-sectional area as the granular materials tested, was heated in the same equipment to over 400° F. in 30 seconds. A 1¼-inch stack of sheet material (example 16) having the same cross-sectional area, but double the weight of the granular material example 12 was heated to 280° F. in 30 seconds. A ¾-inch sheet of example 16A material measuring about 5×7 inches was heated in a disperse field dielectric unit, in 15 seconds, to a temperature sufficiently high to be deformed by hand, indicating the rapid rate of heating attainable, for thermoforming, stamping, and forging applications.

In determining the cost of molded, stamped, or forged products made of plastic material, the cost of the raw materials is only a fraction of the overall cost. Considering labor, equipment amortization, overhead, administration and sales costs, etc. per unit part, the overall unit part cost generally is reduced as parts per hour on any one machine is increased.

The savings obtained, using the polymers of the present disclosure will depend on the size of the objects being produced, the converting process being utilized, and the various factors affecting cost per unit part. The higher rates of production obtainable with the associated savings in cost per unit part, as well as potential improvements in impact strength of molded, stamped, or forged plastic parts, point to the merits of the present disclosure.

While the invention has been described with respect to specific embodiments of the concepts disclosed, in its broader sense, it is not intended that the invention be limited to the embodiments cited, but that it should embrace the various modifications related to the concept of polar domains and other concepts noted in the disclosure.

TABLE I

| Example No. | Tensile strength, p.s.i. | Elongation, percent | Izod (notched), ft. lb. per in. notch | Flow rate, g. per 10 mins. |
| --- | --- | --- | --- | --- |
| 1 | 6,194 | 13 | 5.5 | 0.28 |
| 2 | 5,903 | 25 | 5.3 | 0.45 |
| 3 | 5,972 | 16 | 5.3 | 0.45 |
| 4 | 5,915 | 25 | 5.3 | 0.40 |
| 5 | 5,760 | 22 | 4.94 | 0.45 |
| 6 | 5,843 | 20 | 2.4 | 0.42 |
| 7 | 5,705 | 10 | 1.54 | 0.36 |
| 8 | 5,091 | 40 | 6.68 | 1.2 |
| 9 | 5,102 | 26 | 6.14 | 0.95 |
| 10 | 5,091 | 46 | 6.8 | 1.1 |
| 11 | 4,978 | 36 | 6.96 | 1.2 |
| 12 | 4,855 | 42 | 7.98 | 1.05 |
| 13 | | | | |
| 14 | 4,520 | 10 | 2.08 | 1.0 |

TABLE II.—DIELECTRICALLY HEATED ABS POLYMERS*

| Example No. | Heating time, total seconds | Temperature (° F.) Max. | Temperature (° F.) Increase | Plate current, milliamps max. |
| --- | --- | --- | --- | --- |
| 2 | 30 | 115 | 35 | 440 |
|   | 60 | 165 | 85 | 450 |
|   | 90 | 245 | 165 | 465 |
| 3 | 30 | 115 | 36 | 450 |
|   | 60 | 175 | 95 | 460 |
|   | 90 | 290 | 210 | 500 |
| 7 | 30 | 130 | 50 | 450 |
|   | 60 | 240 | 160 | 480 |
| 8 | 60 | 190 | 110 | 450 |
|   | 90 | >400 | >320 | >600 |
| 9 | 60 | 195 | 115 | 450 |
|   | 90 | >400 | >320 | 640 |
| 10 | 60 | 195 | 115 | 460 |
|   | 90 | >400 | >320 | 640 |
| 11 | 30 | 160 | 80 | 460 |
|   | 60 | >400 | >320 | 750 |
| 12 | 30 | 250 | 170 | 520 |
|   | 45 | >400 | >320 | 760 |
| 13 | 30 | 135+ | 55 | 460 |
|   | 60 | 235 | 155 | 480 |
|   | 75 | >400 | >320 | 680 |
| 14 | 30 | 140 | 60 | 460 |
|   | 60 | 290 | 210 | 520 |
| 15 | 30 | >400 | >320 | 700 |
| 16 | 30 | 280 | 200 | 600 |

*Heated in 3.5 kw. dielectric unit with no load set at 430 milliamps plate current. Frequency range 80-100 meg.; voltage rating 22,000 volts; room temperature of 80° F.; sample holder 2.13" I.D. Teflon.

I claim:

1. A method of substantially increasing the rate of heating of ABS polymers by electromagnetic field energy comprising compounding in an ABS polymer, wherein the uncompounded polymer has a dissipation factor of 0.009 or less, a polar domain containing compound having a nitrile group content of at least 14.7 percent selected from the group consisting of polyacrylonitrile and acrylonitrile-butadiene copolymers, and subjecting the combined mass to electromagnetic field energy in dielectric heating equipment.

* * * * *